(12) United States Patent
VanOrt et al.

(10) Patent No.: US 11,034,279 B2
(45) Date of Patent: Jun. 15, 2021

(54) SLIDE OUT RAMP

(71) Applicant: Lippert Components, Inc., Elkhart, IN (US)

(72) Inventors: Kaleb VanOrt, Granger, IN (US); Trenton Miller, Goshen, IN (US); Marc Grimes, Syracuse, IN (US)

(73) Assignee: Lippert Components, Inc., Elkhart, IN (US)

( * ) Notice: Subject to any disclaimer, the term of this patent is extended or adjusted under 35 U.S.C. 154(b) by 115 days.

(21) Appl. No.: 16/378,761

(22) Filed: Apr. 9, 2019

(65) Prior Publication Data

US 2019/0308548 A1 Oct. 10, 2019

Related U.S. Application Data

(60) Provisional application No. 62/654,566, filed on Apr. 9, 2018.

(51) Int. Cl.
*B60P 3/34* (2006.01)
*B62D 25/20* (2006.01)

(52) U.S. Cl.
CPC ............ *B60P 3/34* (2013.01); *B62D 25/20* (2013.01)

(58) Field of Classification Search
CPC ...... B60P 3/34; B60P 1/00; B60P 3/14; B60P 3/341; B60P 3/343; B60P 1/003; B60P 1/025; B60P 3/0257; B60P 3/32; B62D 33/08; B62D 21/14; B62D 21/02; B62D 21/20; B62D 29/008; B62D 33/02; B62D 33/0215; B62D 33/027

USPC ......... 296/26.13, 26.01, 171, 175, 165, 43, 296/37.6, 37.1, 3, 26.14; 224/403, 404, 224/418, 425, 443, 495, 510, 512, 518, 224/522, 566

See application file for complete search history.

(56) References Cited

U.S. PATENT DOCUMENTS

| | | | |
|---|---|---|---|
| 6,338,523 B1 * | 1/2002 | Rasmussen | B60P 3/34 296/175 |
| 6,802,555 B2 * | 10/2004 | Yoder | B60P 3/34 296/165 |
| 7,234,747 B2 | 6/2007 | Rasmussen | |
| 7,374,218 B2 | 5/2008 | Schneider | |
| 7,588,279 B2 | 9/2009 | Rasmussen | |
| 8,016,343 B2 | 9/2011 | Schwindaman et al. | |
| 8,235,455 B2 | 8/2012 | Schwindaman et al. | |
| 8,240,744 B2 | 8/2012 | Schwindaman et al. | |
| 8,317,250 B2 | 11/2012 | Schwindaman et al. | |
| 8,757,458 B2 | 6/2014 | Nebel | |
| 8,967,694 B2 * | 3/2015 | Garceau | F16H 19/04 296/26.13 |
| 9,007,012 B2 | 4/2015 | Schwindaman et al. | |

(Continued)

*Primary Examiner* — D Glenn Dayoan
*Assistant Examiner* — Sunsurraye Westbrook
(74) *Attorney, Agent, or Firm* — Nixon & Vanderhye P.C.

(57) ABSTRACT

A ramp frame guides a vehicle slide-out room to enable the slide-out room floor to be flush with the vehicle floor when the slide-out room is in its extended position. The ramp frame includes a landing portion including a top wall that is configured to receive the slide-out room in the extended position, and a lifting portion including an inclined section extending from the top wall of the landing portion and a horizontal section extending from a distal end of the inclined section. The horizontal section extends outside of a boundary defined by the top wall of the landing portion.

17 Claims, 7 Drawing Sheets

(56) References Cited

U.S. PATENT DOCUMENTS

| | | |
|---|---|---|
| 9,085,271 B2 | 7/2015 | Kreil |
| 9,694,733 B2 | 7/2017 | Schwindaman et al. |
| 10,093,219 B2 | 10/2018 | Schwindaman et al. |
| 2004/0007890 A1* | 1/2004 | Blodgett, Jr. ............. B60P 3/34 296/26.12 |
| 2004/0124651 A1* | 7/2004 | Huffman ................... B60P 3/34 296/26.01 |

* cited by examiner

SLIDE OUT RAMP

CROSS-REFERENCES TO RELATED APPLICATIONS

This application claims the benefit of U.S. Provisional Patent Application No. 62/654,566, filed Apr. 9, 2018, the entire content of which is herein incorporated by reference.

STATEMENT REGARDING FEDERALLY SPONSORED RESEARCH OR DEVELOPMENT (NOT APPLICABLE)

BACKGROUND

The present disclosure is directed to a ramp apparatus for guiding, raising, and lowering a retractable room of a mobile unit between an elevated position where the room is above the floor of the mobile unit and a lowered position where a room floor is flush with the mobile unit floor when the retractable room is extended.

Responding to the need for more living space inside recreational vehicles (RVs), various RVs incorporate features such as pop-up tops acid/or slide-out rooms for selectively expanding the interior living area. Designed to be used primarily when the RV is parked, these rooms are typically positioned in the interior of the RV during travel, and are moved outwardly when the RV is parked. Upon parking the RV, the slide-out rooms or compartments are moved horizontally to an extended position to increase the useable interior space of the vehicle.

It is desirable for slide-out room systems to be constructed such that the floor of the slide-out room is flush with the floor inside the vehicle when the slide-out room is extended. Conventional slide-out systems have been able to create a flush floor slide-out room by sloping the system used to move the slide-out room downward at its extended position.

BRIEF SUMMARY

The slide-out ramp of the described embodiments includes a ramp frame that supports the slide-out room during the transition between retracted and extended positions and guides the slide-out room to a lowered position when fully extended so that the floor of the slide-out room is flush with the floor inside the vehicle.

In an exemplary embodiment, a ramp frame for guiding a vehicle slide-out room includes a landing portion including a top wall that is configured to receive the slide-out room in an extended position, and a lifting portion including an inclined section extending from the top wall of the landing portion and a horizontal section extending from a distal end of the inclined section. The horizontal section extends outside of a boundary defined by the top wall of the landing portion. The lifting portion may include at least one lifting portion trough on a slide-out room side thereof. A nylon wear rod may be positioned in the lifting portion trough.

The landing portion may be generally rectangular and hollow. In this context, the landing portion may be filled with support material. The landing portion may include a bottom wall and front and rear walls connected between the bottom wall and the top wall. Additionally, the landing portion may further include an internal wall disposed between the top wall and the bottom wall.

The top wall may include a landing portion trough on a slide-out room side thereof. A nylon wear rod may be positioned in the landing portion trough. A first screw boss may be positioned outboard of and adjacent the landing portion trough and facing an opposite direction. A second screw boss may be positioned at a junction of the lifting portion and the landing portion.

The horizontal section of the lifting portion may be positioned relative to the landing portion to engage a vehicle floor.

In another exemplary embodiment, a slide-out room system includes a slide-out room supported in an opening in a vehicle wall that is displaceable between a retracted position and an extended position, and the ramp frame of the described embodiments. An inner edge of the slide-out room may be beveled to have an angle that is generally complementary to an incline angle of the inclined section.

BRIEF DESCRIPTION OF THE DRAWINGS

These and other aspects and advantages will described in detail with reference to the accompanying drawings, in which.

DETAILED DESCRIPTION

Figure 1A:
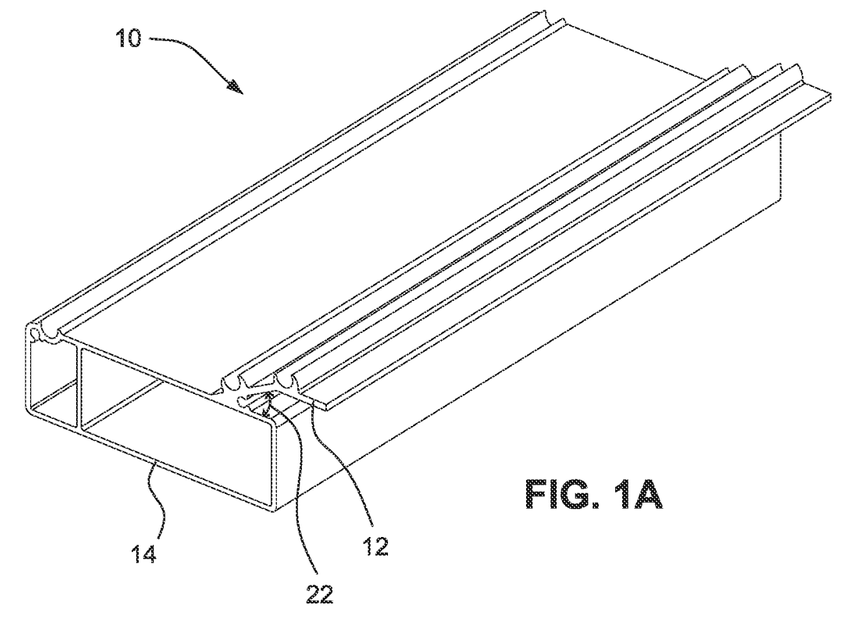
FIG. 1A is a perspective view of an illustrative ramp apparatus according to the present disclosure.
Figure 1B:
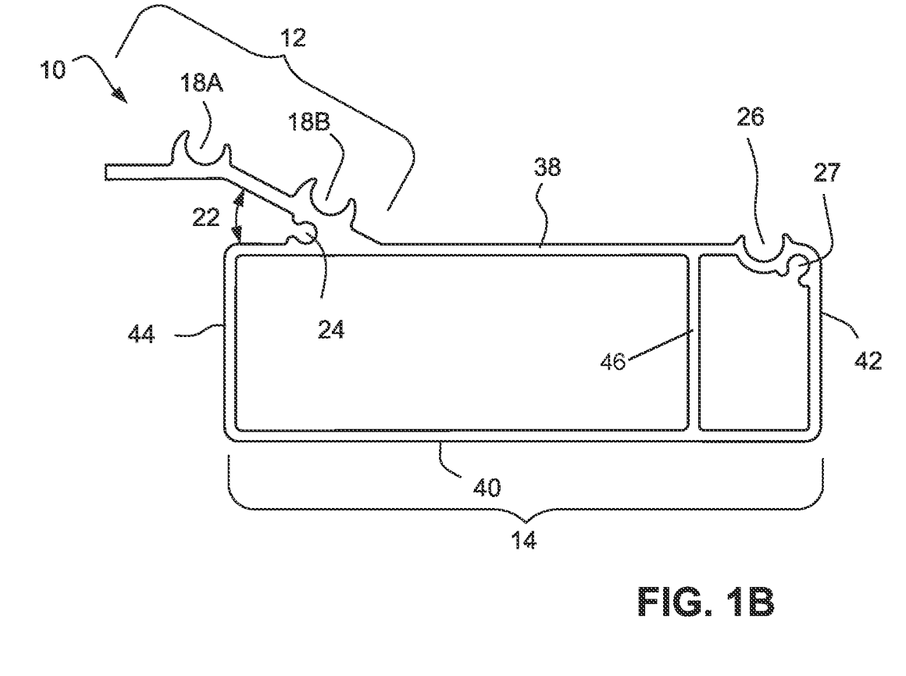
FIG. 1B is a cross-sectional view thereof.
Figure 2:
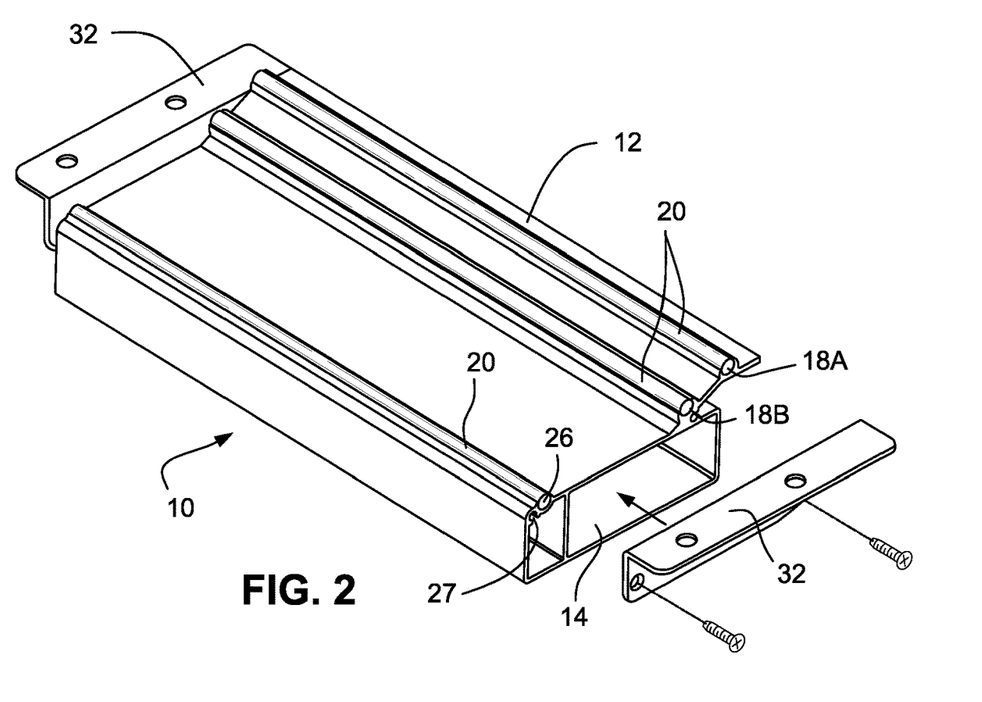
FIG. 2 is a perspective view of the apparatus with mounting flanges.
Figure 3:
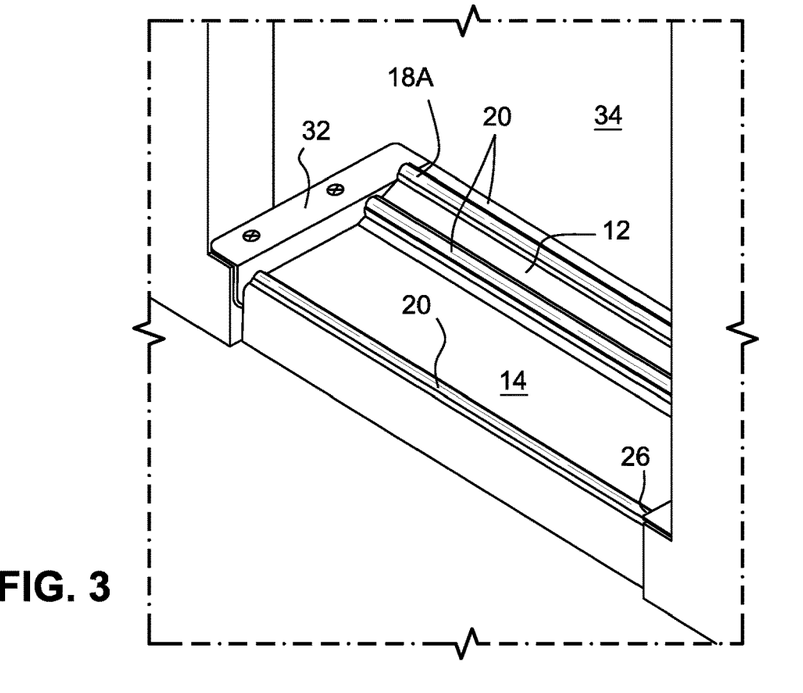
FIG. 3 is a perspective view of the apparatus installed into a mobile unit.
Figure 4:
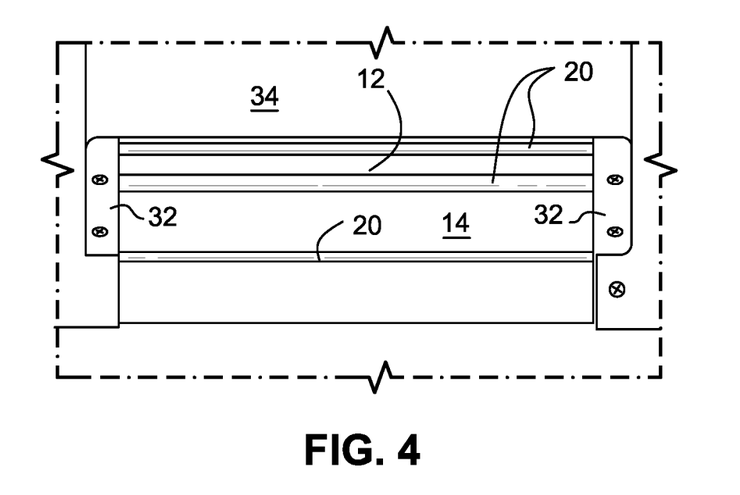
FIG. 4 is a front perspective view of the apparatus installed into a mobile unit.
Figure 5:
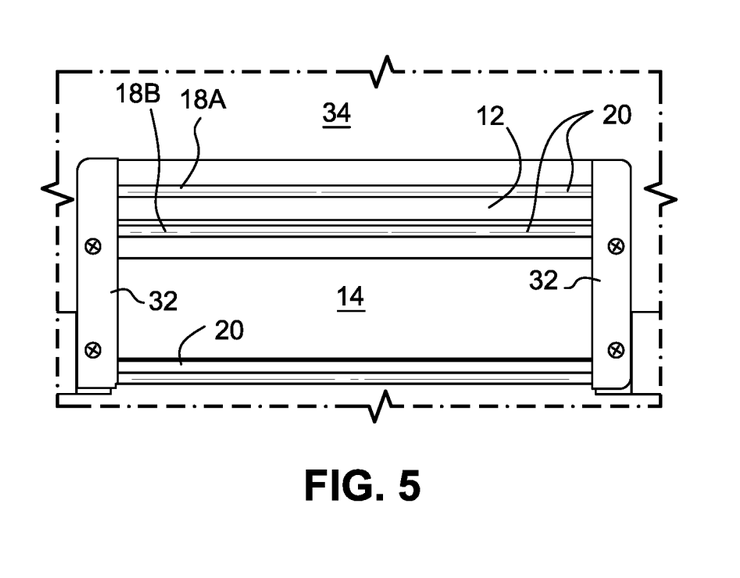
FIG. 5 is a top perspective view of the apparatus installed into a mobile unit.
Figure 6:
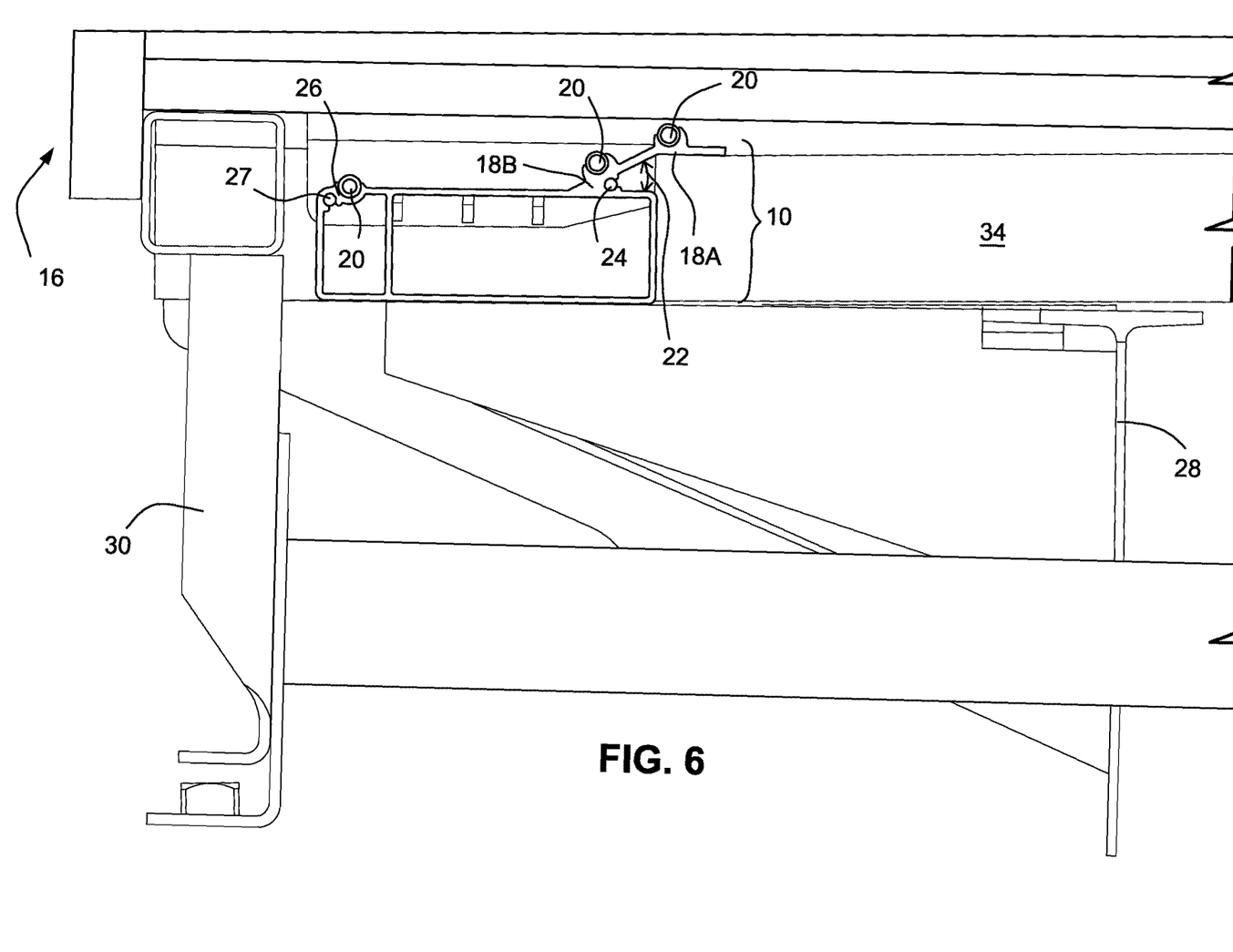
FIG. 6 is a cross-sectional side view of the apparatus installed in a mobile unit including a retractable room that is in the retracted position.
Figure 7:
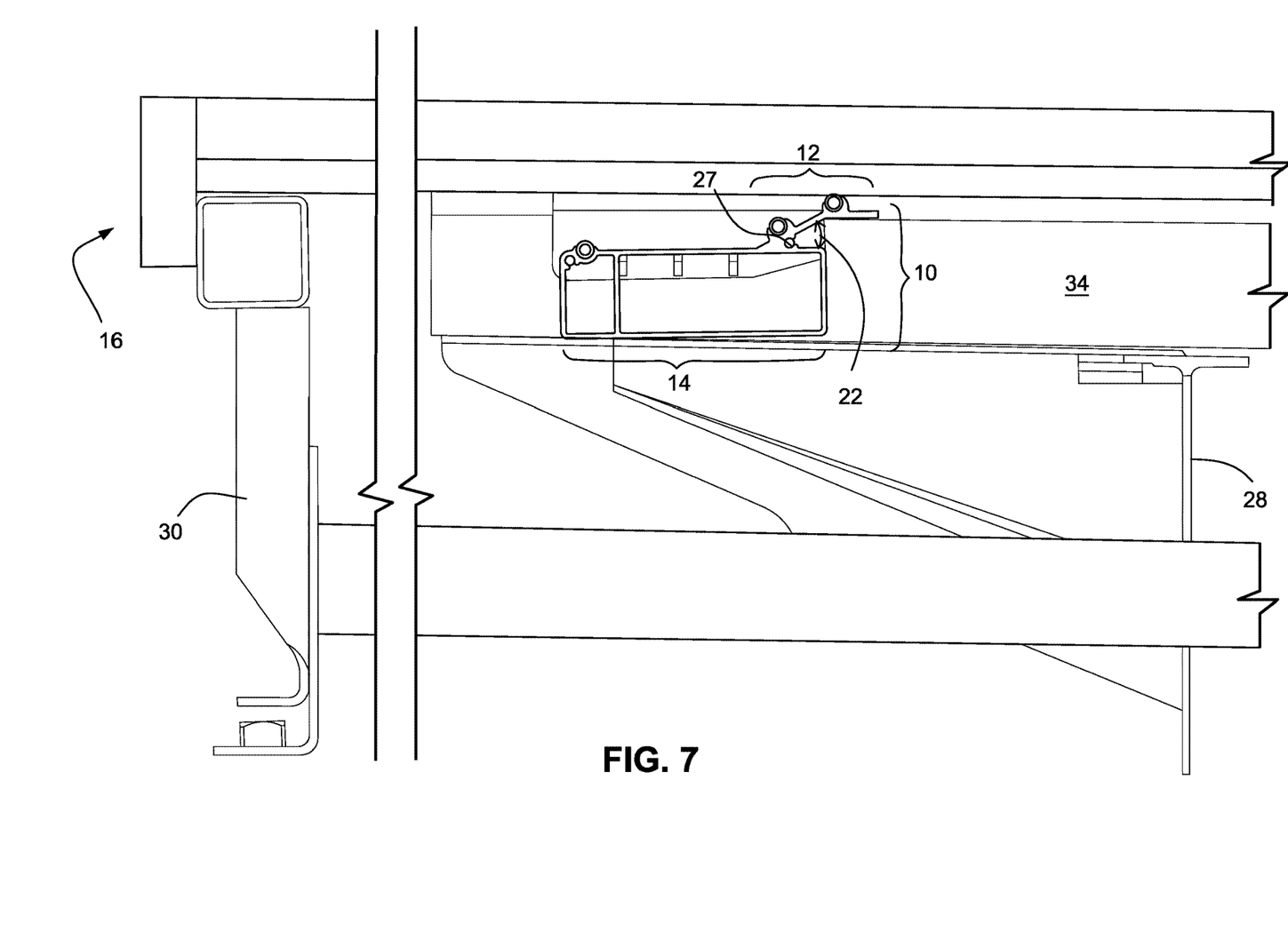
FIG. 7 is a cross-sectional side view of the apparatus installed in a mobile unit including a retractable room that is between the retracted and extended positions.
Figure 8:
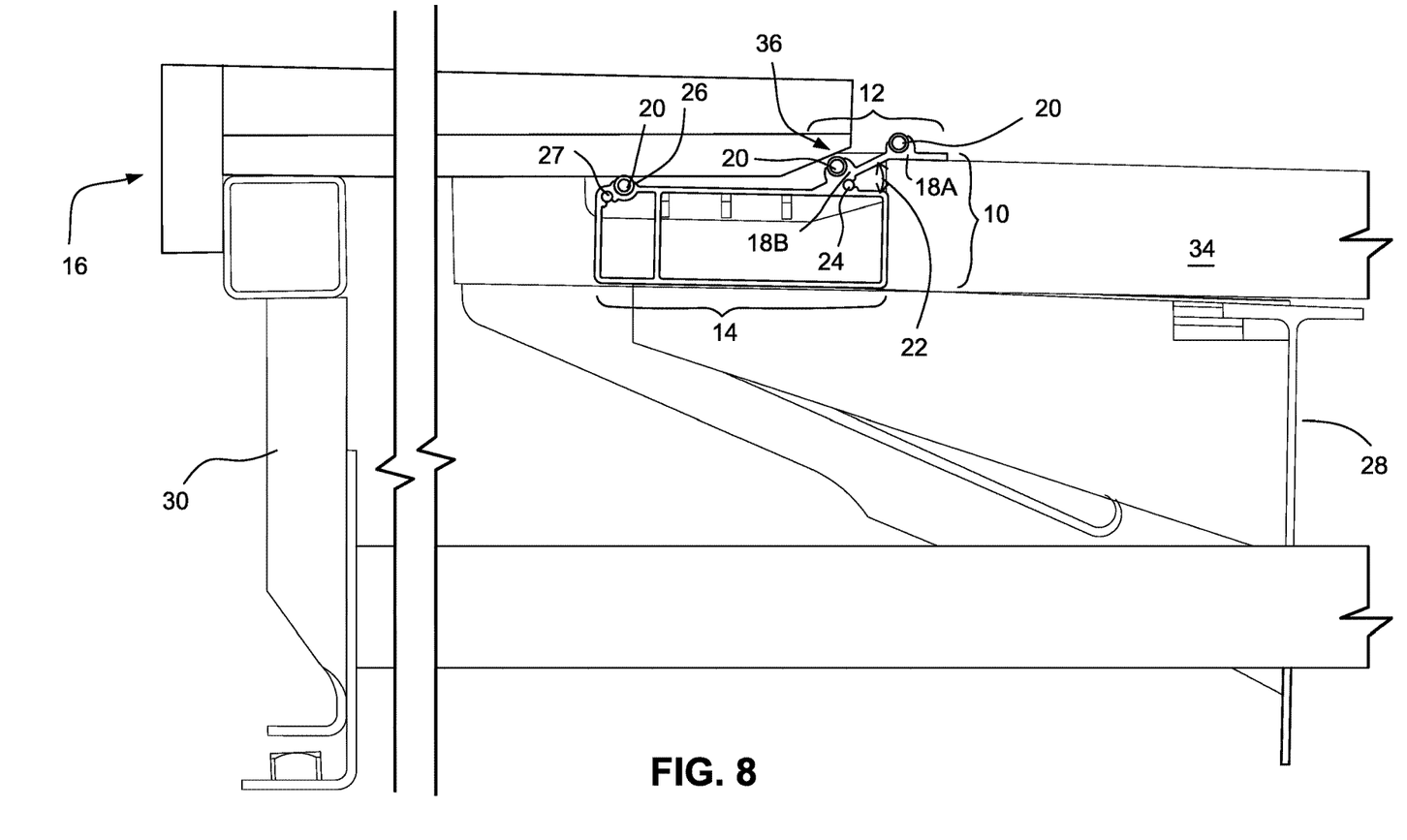
FIG. 8 is a cross-sectional side view of the apparatus installed, in a mobile unit including a retractable room that is in the extended position.

With reference to FIGS. 1A and 1B, a slide ramp frame apparatus 10 comprises an elongated lifting portion 12 and an elongated landing portion 14 for guiding and supporting a retractable room 16, as seen in FIGS. 6-8, as it is both extended and retracted. The apparatus 10 may be made of any suitable material, for example, aluminum, another metal, or a polymer.

The lifting portion 12 includes a substantially horizontal portion and an inclined portion that extends from the horizontal portion at a downward angle from the horizontal portion. The downward angle may vary based on factors such as the size of the retractable room, the size of the opening for the room in the unit, or other factors. In the embodiment shown, the downward angle is approximately 30°. As seen in FIG. 1B, the upward-facing surface of the lifting portion 12 defines two semi-circular troughs 18A, 18B. The troughs are sized and shaped to receive elongated nylon wear rods 20 for reducing friction between the retractable room 16 and apparatus 10 to facilitate the movement of the retractable room. In other embodiments, there could be more or fewer than two troughs on the inclined portion of the lifting portion, and they could be shaped and sized to receive a roller or another component made of a low-friction material.

The landing portion 14 is generally rectangular and hollow, but can be filled with structural or supporting material to strengthen the landing portion and enhance its ability to support the retractable room 16. As best seen in FIG. 1B, the landing portion 14 may have a top wall 38, a bottom wall 40, a front wall 42 and a rear wall 44. The landing portion may include one or more internal walls 46 to stiffen or reinforce the landing portion 14. For example, as shown in FIG. 1B, the landing portion 14 may include an internal wall 46 connecting the top wall 38 and the bottom wall 40.

Figure 9:
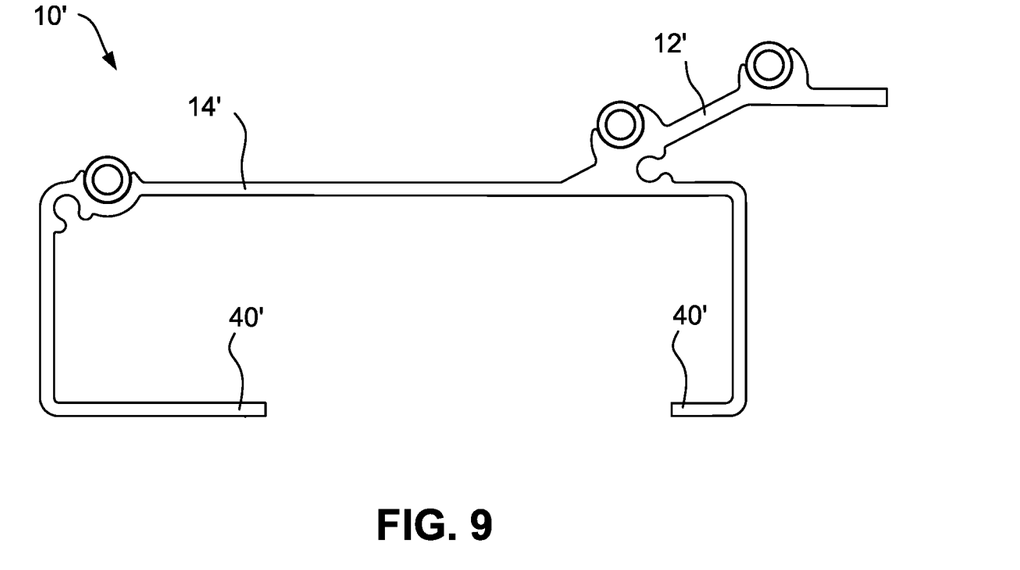
FIGS. 9 and 10 show an alternative embodiment utilizing less material.
Figure 10:
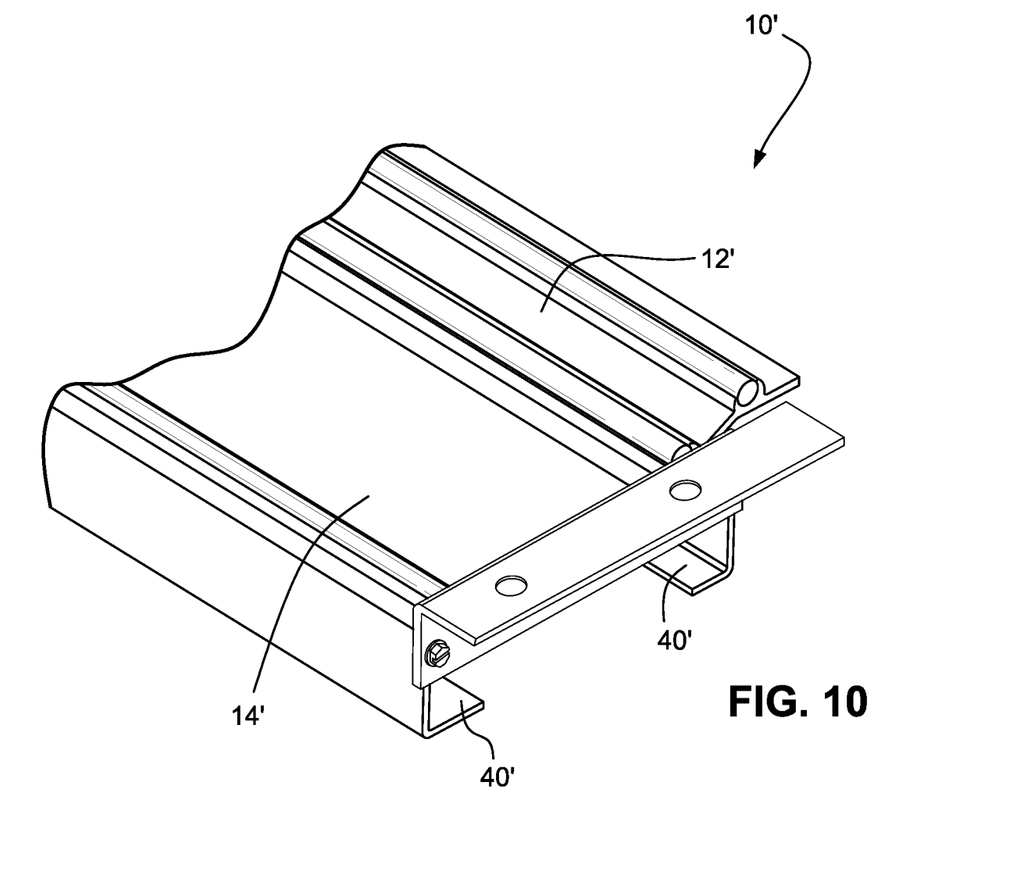

FIGS. 9 and 10 show a variation of the landing portion 14' with a section of the bottom wall 40' removed. By using less material, the weight of the apparatus 10' and cost of materials can be reduced.

The upper surface of the top wall 38 of the landing portion 14 may define a semi-circular trough 26 proximate the front wall 42 thereof for receiving a nylon wear rod 20. As seen in FIG. 1B, there may be a screw boss 27 outboard of and adjacent to the trough 26 that depends downward from the upper surface of the top wall 38 of the landing portion 14. A similar screw boss 24 may be provided in an inner corner 22 of the lifting portion 12. The screw bosses 24, 27 may receive a fastener for mounting the slide ramp assembly to the vehicle.

An end of the inclined portion of the lifting portion 12 is connected to the top wall 38 of the landing portion 14 proximate the rear wall 44 thereof. In some embodiments, the lifting portion 12 is connected to the landing portion 14 approximately a fourth of the distance from the rear to the front of the landing portion 14. In other embodiments, the lifting portion 12 could be connected to the landing portion 14 at a location that is closer to or further away from the second side of the landing portion. The included angle formed between the lifting portion 12 and the landing portion 14, as seen in FIG. 1B defines the inner corner 22, and may further define the screw boss 24 for receiving a fastener for mounting the apparatus to the vehicle.

As seen in FIGS. 6-8 the apparatus 10 may be secured to be substantially flush with the floor 34 of the vehicle. The apparatus 10 may be mounted to a portion of the vehicle floor 34 that is proximate an outrigger 28 of the vehicle chassis. The placement of the apparatus with respect to the outrigger 28 may be dependent upon the size of the retractable room, among other factors. As seen in FIGS. 2-5, the apparatus 10 may be inset into an opening in the vehicle floor 34 and connected thereto by at least one mounting flange 32 and fasteners such as bolts for each side of the slide ramp assembly. The fasteners received in the screw bosses 24, 27 mount the slide ramp assembly 10 to the mounting flanges 32.

The retractable room 16 is mounted to a slide arm assembly 30, which moves the room between the extended and retracted positions. In the retracted position, there may be contact between the underside of the retractable room 16 and the wear rod 20 of the uppermost inclined portion trough 18A. The underside of the retractable room slides along the wear rod 20 until the inner edge of the retractable room reaches the apparatus 10. At this point, the retractable room 16 is in or near the extended position. The inner edge 36 of the retractable room may be beveled or cut to have an upwardly depending angle that is generally complementary to the angle of the lifting portion 12 of the apparatus. The additional wear rods 20 support the retractable room 16 as it slides into the flush floor position and may facilitate further outward extension of the room if necessary. The wear rods 20 also facilitate retraction of the room by reducing potential friction between the angled edge 36 of the retractable room 16 and the landing portion 14 and lifting portion 12 of the apparatus.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ramp frame for guiding a vehicle slide-out room, the ramp frame comprising:
    a landing portion including a top wall that is configured to receive the slide-out room in an extended position; and
    a lifting portion including an inclined section extending from the top wall of the landing portion and a horizontal section extending from a distal end of the inclined section, wherein the horizontal section extends outside of a boundary defined by the top wall of the landing portion,
    wherein the lifting portion comprises at least one lifting portion trough on a slide-out room side thereof, and wherein the at least one lifting portion trough is configured to secure a low friction material or mechanism to be engaged by the slide-out room.

2. A ramp frame according to claim 1, further comprising the low-friction material or mechanism secured in the at least one lifting portion trough, wherein the low-friction material or mechanism comprises a nylon wear rod positioned in the lifting portion trough.

3. A ramp frame according to claim 2, wherein the lifting portion comprises two lifting portion troughs.

4. A ramp frame according to claim 1, wherein the landing portion is generally rectangular and hollow.

5. A ramp frame according to claim 4, wherein the landing portion is filled with support material.

6. A ramp frame according to claim 1, wherein the landing portion comprises a bottom wall and front and rear walls connected between the bottom wall and the top wall.

7. A ramp frame according to claim 6, wherein the landing portion further comprises an internal wall disposed between the top wall and the bottom wall.

8. A ramp frame according to claim 1, wherein the top wall comprises a landing portion trough on a slide-out room side thereof.

9. A ramp frame according to claim 8, further comprising a nylon wear rod positioned in the landing portion trough.

10. A ramp frame according to claim 8, further comprising a first screw boss positioned outboard of and adjacent the landing portion trough and facing an opposite direction.

11. A ramp frame according to claim 10, further comprising a second screw boss positioned at a junction of the lifting portion and the landing portion.

12. A ramp frame for guiding a vehicle slide-out room, the ramp frame comprising:
    a landing portion including a top wall that is configured to receive the slide-out room in an extended position; and
    a lifting portion including an inclined section extending from the top wall of the landing portion and a horizontal section extending from a distal end of the inclined section, wherein the horizontal section extends outside of a boundary defined by the top wall of the landing portion, and wherein the horizontal section of the lifting portion is positioned relative to the landing portion to engage a vehicle floor.

13. A slide-out room system comprising:
   a slide-out room supported in an opening in a vehicle wall, the slide-out room being displaceable between a retracted position and an extended position; and
   a ramp frame for guiding the slide-out room, the ramp frame comprising:
      a landing portion including a top wall that is configured to receive the slide-out room in the extended position,
      a lifting portion including an inclined section extending from the top wall of the landing portion and a horizontal section extending from a distal end of the inclined section, wherein the horizontal section extends outside of a boundary defined by the top wall of the landing portion, and
      a low-friction material or mechanism secured on the lifting portion and positioned for engagement with the slide-out room,
      wherein the lifting portion comprises at least one lifting portion trough on a slide-out room side thereof, and wherein the low-friction material or mechanism is secured in the lifting portion trough.

14. A slide-out room system according to claim 13, wherein an inner edge of the slide-out room is beveled to have an angle that is generally complementary to an incline angle of the inclined section.

15. A slide-out room system according to claim 13, wherein the low-friction material or mechanism comprises a nylon wear rod positioned in the lifting portion trough, the nylon wear rod engaging an underside of the slide-out room.

16. A slide-out room system according to claim 15, wherein the top wall comprises a landing portion trough on a side of the landing portion that is facing the slide-out room.

17. A ramp frame for guiding a vehicle slide-out room, the ramp frame comprising:
   a landing portion including a top wall that is configured to receive the slide-out room in an extended position, wherein the top wall comprises a landing portion trough on a slide-out room side thereof and a nylon wear rod positioned in the landing portion trough; and
   a lifting portion including an inclined section extending from the top wall of the landing portion and a horizontal section extending from a distal end of the inclined section, wherein the lifting portion comprises at least one lifting portion trough on a slide-out room side thereof and a nylon wear rod positioned in the lifting portion trough,
   wherein the landing portion trough, the lifting portion trough, and the respective nylon wear rods are positioned to be engaged by an underside of the slide-out room.

* * * * *